United States Patent
Nakajima

(10) Patent No.: US 7,599,992 B2
(45) Date of Patent: Oct. 6, 2009

(54) AUTONOMOUS RENDERING OF EMAIL ATTACHMENTS

(75) Inventor: Satoshi Nakajima, Redmond, WA (US)

(73) Assignee: UIEvolution, Inc., Bellevue, WA (US)

( * ) Notice: Subject to any disclaimer, the term of this patent is extended or adjusted under 35 U.S.C. 154(b) by 806 days.

(21) Appl. No.: 10/082,601

(22) Filed: Feb. 22, 2002

(65) Prior Publication Data

US 2003/0163531 A1 Aug. 28, 2003

(51) Int. Cl.
G06F 15/16 (2006.01)
(52) U.S. Cl. ............................ 709/206; 709/246; 707/1; 715/746; 715/752
(58) Field of Classification Search ........... 709/20–207, 709/238, 246; 707/1; 715/746, 752
See application file for complete search history.

(56) References Cited

U.S. PATENT DOCUMENTS

| | | | |
|---|---|---|---|
| 6,014,688 A * | 1/2000 | Venkatraman et al. ...... 709/206 |
| 6,178,432 B1 * | 1/2001 | Cook et al. .................. 715/513 |
| 6,272,484 B1 * | 8/2001 | Martin et al. .................. 707/1 |
| 6,598,076 B1 * | 7/2003 | Chang et al. ................. 709/206 |
| 6,839,741 B1 * | 1/2005 | Tsai ............................ 709/217 |
| 6,925,597 B2 * | 8/2005 | Anwar ......................... 715/209 |
| 2002/0059347 A1 * | 5/2002 | Shaffer et al. ............... 707/516 |
| 2002/0059565 A1 * | 5/2002 | Reyna et al. ................. 717/146 |
| 2002/0111995 A1 * | 8/2002 | Mansour et al. ............ 709/203 |
| 2003/0046349 A1 * | 3/2003 | Burgin et al. ............... 709/206 |

* cited by examiner

Primary Examiner—Kenny S Lin
Assistant Examiner—Duyen Doan
(74) Attorney, Agent, or Firm—Schwabe, Williamson & Wyatt P.C.

(57) ABSTRACT

An enhanced email agent generates a self-contained representation of a binary file attachment for transmission to one or more designated recipients. Each recipient may view the content of the binary file using only a generic web browser and otherwise independent of the software or hardware configuration of the recipient's computing device web browser. In on embodiment, one or more user interface displays are generated based at least in part upon one or more state-based transition specifications so as to enable platform independent viewing of content from the binary file each recipient.

20 Claims, 10 Drawing Sheets

```
<Display State S1> ~ 802a
    <Display Cell C1> ~ 804a
        ......
    </End Display Cell C1>
    <Display Cell C2> ~ 804b
        ......
    </End Display Cell C2>

<Transition R1> Display State x </End Transition R1> ~ 806a
    <Transition R2> Display State y </End Transition R2> ~ 806b </End Display State S1>

<Display State S1> ~ 802b
    <Display Cell C1> ~ 804a
        ......
    </End Display Cell C1>
    <Display Cell C2> ~ 804c
        ......
    </End Display Cell C2>

<Transition R3> Display State x </End Transition R3> ~ 806c
    <Transition R4> Display State z </End Transition R4> ~ 806d </End Display State S1>
```

Figure 10

AUTONOMOUS RENDERING OF EMAIL ATTACHMENTS

BACKGROUND OF THE INVENTION

1. Field of the Invention

The invention relates generally to data processing and, in particular to rendering electronic mail attachments.

2. Background Information

With advances in integrated circuit, microprocessor, networking and communication technologies, an increasing number of devices, in particular, digital computing devices, are being interconnected together. This increased interconnectivity of computing devices has laid the groundwork for a communication infrastructure particularly well-suited for enabling electronic communications between such computing devices. More specifically, the increased interconnectivity of computing devices has led to the adoption of electronic mail (email) as a near ubiquitous mode of communication.

In the past, email applications were limited to facilitating the exchange of text-based messages between a relatively small populous of individuals. Over time, however, email applications and associated communications protocols have become increasingly sophisticated enabling more complex messages to be exchanged between widespread groups of individuals. For example, in addition to enabling the exchange of text-messages, many modern day email applications additionally enable users to exchange binary files. These files (often referred to as attachments) are typically encoded within an email message (using e.g. an encoding scheme such as Multipurpose Internet Mail Extensions (MIME), Uuencode, BinHex and so forth) before the message is transmitted to the designated recipient(s). Upon receipt of the encoded email message, the recipient's email application decodes the message and extracts the binary attachment. Once the attachment is "detached" from the message, the recipient is able to save the attachment onto a storage medium such as a hard drive or floppy disk, or view the attachment on a display device assuming the recipient's client device is equipped with the appropriate software.

In the past, recipients of a binary file were required to have a copy of the source application used to generate the binary file installed on their client device if they wanted to view the binary attachment. Unfortunately, however, such source applications are typically packaged and sold as part of expensive productivity suites that are unaffordable to many individuals. Because a sender could not always guarantee that a given recipient would have a copy of the source application installed on their client device, application-specific viewers were developed. These application-specific viewers were typically distributed free of charge and provided users with the minimum functionality required to enable users to view documents of a particular proprietary format. Unfortunately, however, the existence and location of these viewers was not always readily ascertainable, and it was often the recipient's responsibility to locate and download the application specific viewer as needed. Depending upon the recipient's Internet accessibility, this could take a long time thereby frustrating the near immediate gratification typically afforded by email.

Furthermore, with the introduction of web-based email clients, individuals are able to access their email at nearly any location around the world so long as a web connection is available. For example, it is not uncommon for business travelers to use hotel-supplied web clients to access their respective email accounts. In order for the business traveler to view a proprietary attachment, however, the associated source application would need to be installed on the client device that is being used by the traveler to access the respective email account. This however, is not always possible or practical.

BRIEF DESCRIPTION OF THE DRAWINGS

The invention is illustrated by way of example, and not by way of limitation in the figures of the accompanying drawings in which like reference numerals refer to similar elements, and in which:

FIG. 10 illustrates an XML like specification approach suitable for use to practice the end user interface specification aspect of the present invention, in accordance with one embodiment.

DETAILED DESCRIPTION

For purposes of explanation, specific numbers, materials and configurations are set forth in the following description in order to provide a thorough understanding of the invention. It will be apparent, however, to one skilled in the art that the invention may be practiced without these specific details. In some instances, structures and devices are shown in block diagram form in order to avoid obscuring the invention. In other instances, well-known features are omitted or simplified in order not to obscure the present invention. For ease of understanding, certain method steps are delineated as separate steps, however, these separately delineated steps should not be construed as necessarily order dependent in their performance. Furthermore, reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment. Furthermore, the particular features, structures, or characteristics may be combined in any suitable manner in one or more embodiments.

Overview

Figure 1:
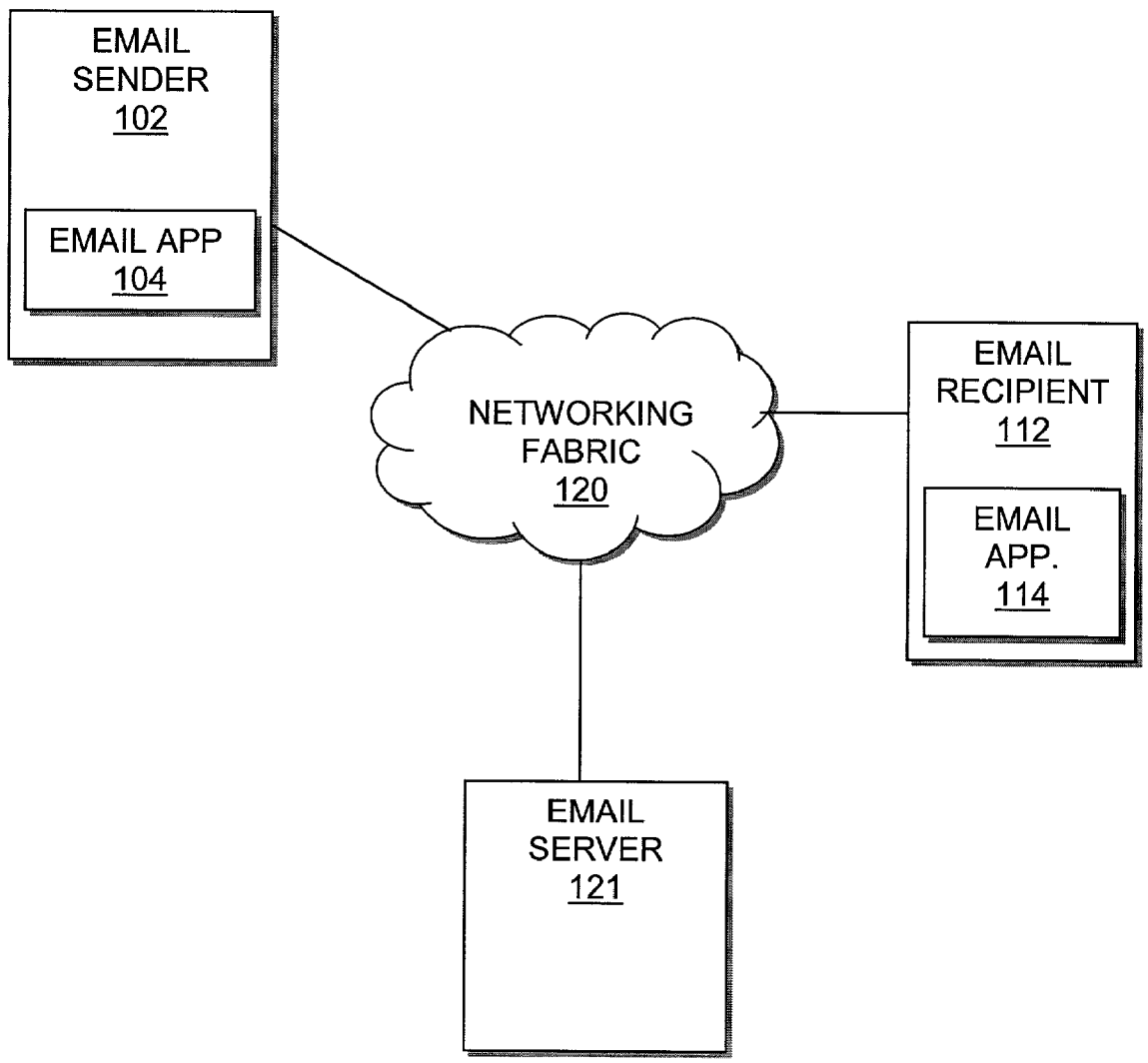
FIG. 1 illustrates a network view of the present invention, including an enhanced email program, in accordance with one embodiment.
Figure 2:
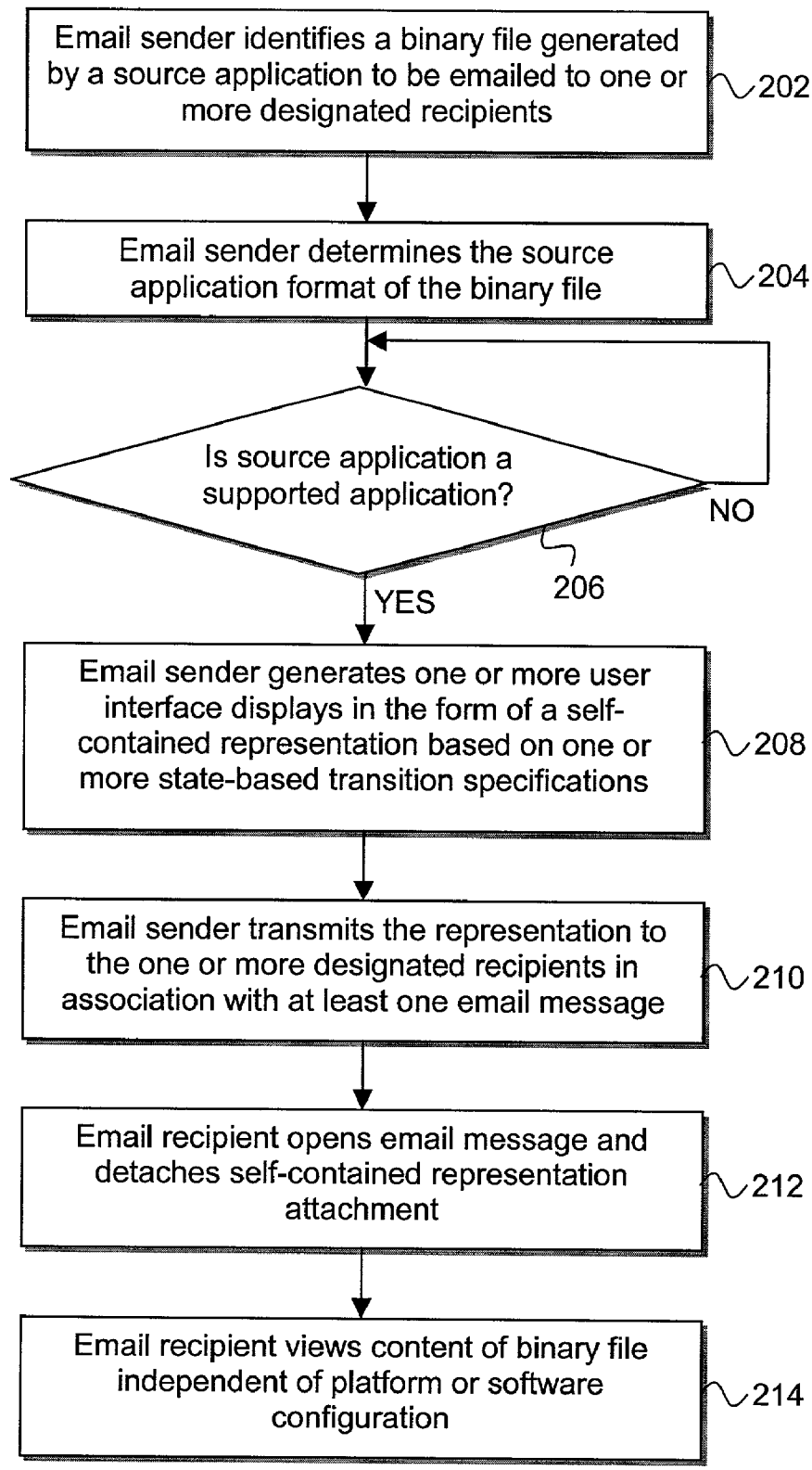
FIG. 2 illustrates a method view of the same invention, in accordance with one embodiment.

Reference is now drawn to FIGS. 1-2, wherein two block diagrams illustrating a network view and a method view of the present invention, in accordance with one embodiment, are shown. As illustrated in FIG. 1, the computing equipment of email sender 102, email recipient 112, and email server 121 are interconnected with each other through networking fabric 120. The computing equipment of email sender 102 and email recipient 104 are correspondingly provided with enhanced email programs 104 and 114 incorporated with the teachings of the present invention. In an alternative embodiment, email server 121 may further be provided with an enhanced email program incorporated with the teachings of the present invention. Together, these elements facilitate practice of the autonomous attachment rendering features of the present invention.

The equipment employed by email sender 102 and recipient 112 may be any one of a broad range of email hosting capable equipment known in the art. Examples of such equipment include but are not limited to computers of various form factors, desktop, laptop, palm sized, as well as personal digital assistants (PDA), set-top box, and wireless cell phones known in the art. Except for the incorporated teachings of the present invention, email programs 104 and 114 and email server 121 are intended to represent a broad range of client/server email programs/services known in the art. Email programs 104 and 114 are intended to represent a broad range of email specific client implementations known in the art, such as Lotus Notes and Outlook Express clients available from IBM of Armonk, N.Y., and Microsoft Corp. of Redmond, Wa. However, as will be appreciated by those skilled in the art, in alternate embodiments, "email programs" 104 and 114 may also be a generic client, such as a browser, used for email as well as other applications. The generic client, when used for an email application, is used to render an email application or email service's user interface, and the email application/service is executed on the "remote" server. An example of email applications/services employing a generic client is Hotmail offered by Microsoft Network of Redmond, Wash. Thus, depending on the embodiments, the enhancements to email programs 104 and 114 described herein, may be implemented on the client side of the email program, the server side of the email program/service, or distributively on both the client side and the server side.

As illustrated in FIG. 2, in accordance with the present invention, email sender 102 using enhanced email program 104 identifies one or more binary files to attach to an email message for transmission to one or more designated recipients, block 202. In one embodiment, the binary file is identified by enhanced email program 104 through e.g. user input received via a file selection dialog box, however other methods of file selection/identification may also be utilized. Since the binary file may represent a wide variety of file types including but not limited to a word processing document or a spreadsheet, once enhanced email program 104 has identified the binary files(s), the family of source applications used to generate/create the binary file is further determined, block 204. In one embodiment, the filename extension used in association with the binary file's filename is used to determine the family of source applications, however, other methods such as the use of meta tags and/or pattern matching may instead be used. A filename extension of ".doc" for example, might indicate that a binary file was created using one of the "Word" word processing family of applications from Microsoft. In accordance with the teachings of the present invention, knowledge of the actual release version (e.g. Word version 6.0, Word 95, etc.) of the application used to create the binary file is not necessary.

Once the source application used to create the binary file is determined, a further determination is made as to whether the source application represents one application or a family of applications supported by enhanced email program 104, block 206. If it is determined that the binary file was created using an application supported by enhanced email program 104, then an autonomous or self-contained representation of the content of the binary file is generated in the form of one or more user interface displays, block 208. In one embodiment, enhanced email program 104 utilizes one or more state-based transition specifications or rules to generate one or more user interface displays to characterize the self-contained representation.

Once generated, the self-contained representation is transmitted to one or more designated recipients, block 210. In one embodiment, the self-contained representation is transmitted in the form of an email attachment. After receiving the attachment, a recipient may detach the attachment from the email message, block 212, and view the content of the binary file independent of the recipient's hardware or software configuration, block 214. Alternatively, if the recipient's operating system supports associating applications to file types as Microsoft Windows does, the attachment may be viewable without having to be detached first, e.g. by double clicking on the attachment while viewing the message.

The terms "self-contained", self-sufficient" and "autonomous" are used interchangeably herein to describe an advantageous aspect of the present invention. More specifically, due to the nature of the generated representation, any recipient of the representation may display the contents of the binary file in a platform independent manner without the need for a special-purpose viewer. In accordance with the present invention, a "self-contained" or "self-sufficient" representation refers to all binary files/representations not having a dependency beyond typical system services and generic utilities such as a browser. It is not meant to suggest that there are absolutely no dependencies on any external code outside of the "attachment", as there is virtually no 100% pure self-contained or non-reliant, independently executable binaries. At a minimum, there is at least going to be some basic operating system service dependency, such as GETMAIN, if designed for use and executed in a shared environment. Beyond the basic system services, the embodiments described herein rely only on the presence of the generic agent, the browser. But, like underlying operating services, most users will have such "generic agents". However, the dependency does not extend to specific applications such as Word, Excel, WordPerfect, and so forth.

These and other aspects of the present invention will be described in further detail below.

Email Sender

Figure 3:
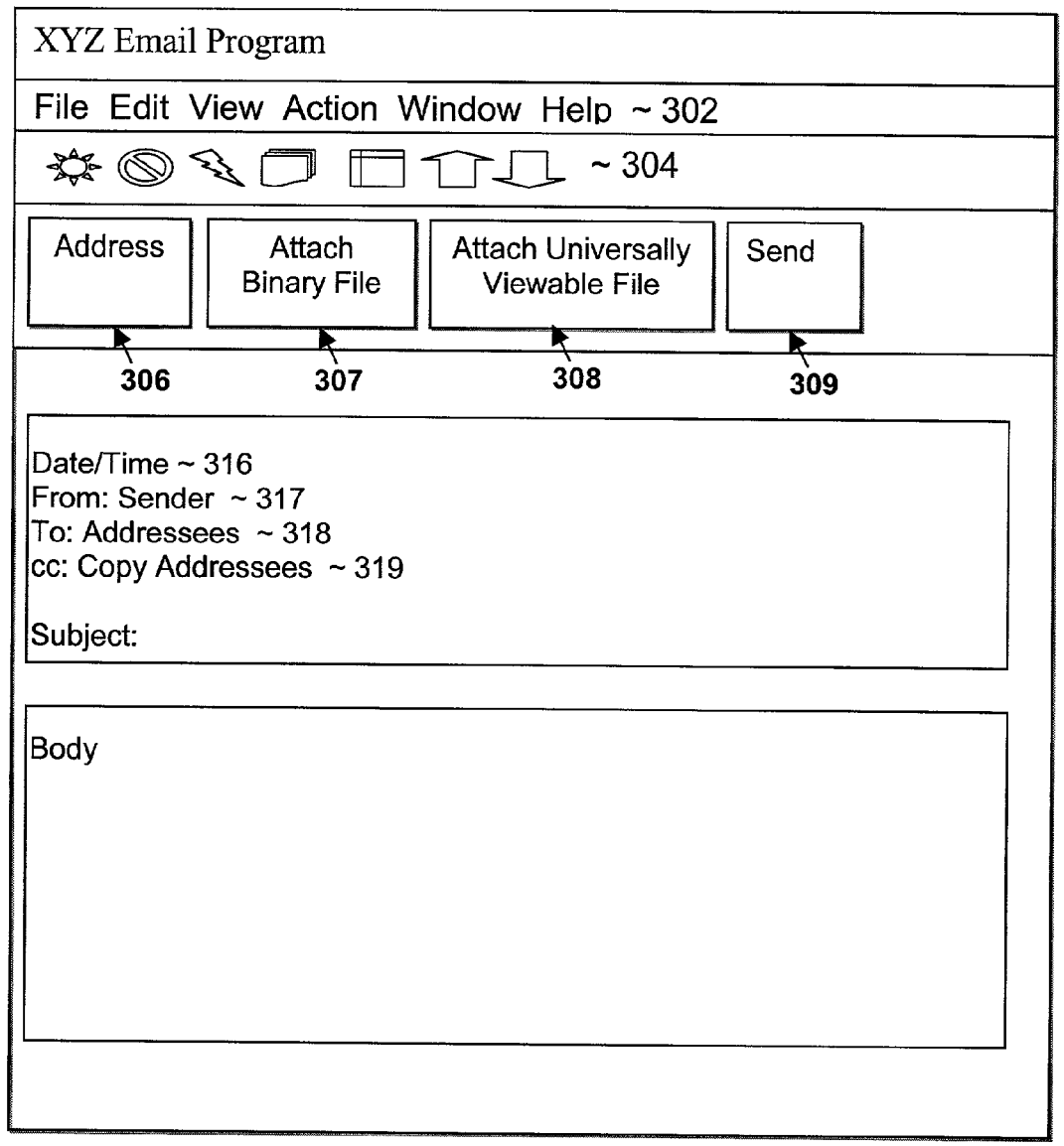
FIG. 3 illustrates an example end user interface suitable for use to practice the email sender aspect of the present invention, in accordance with one embodiment.

FIG. 3 illustrates an example end user interface suitable for use to practice the email sender aspect of the present invention, in accordance with one embodiment. As illustrated in FIG. 3, similar to other email sender end user interfaces, example end user interface 300 includes menu 302 of "drop down" commands, i.e. "File", "Edit" and so forth, menu 304 of action icons, a number of command buttons 306-309, and miscellaneous date/time, from, to and copy addressee fields 316-319. However, unlike prior art email sender end user interfaces, command buttons 306-309 include a novel "attach universally viewable file" command button 308. In one embodiment, an email sender may select command button 308 to generate and attach a self-contained representation of the contents of an indicated binary file. In an alternative embodiment where email server 121 is equipped with the enhanced email program of the present invention, such a self-contained representation may be automatically generated by email server 121 upon its receiving a binary attachment-equipped email message. In other embodiments, email sender 102 may include an indicator or conversion flag to indicate to email server 121 (equipped with the enhanced email program of the present invention) that a self-contained representation of an attached binary file should be generated prior to its being transmitted to one or more email recipients 112.

User Interface Display Generation

Figure 4:
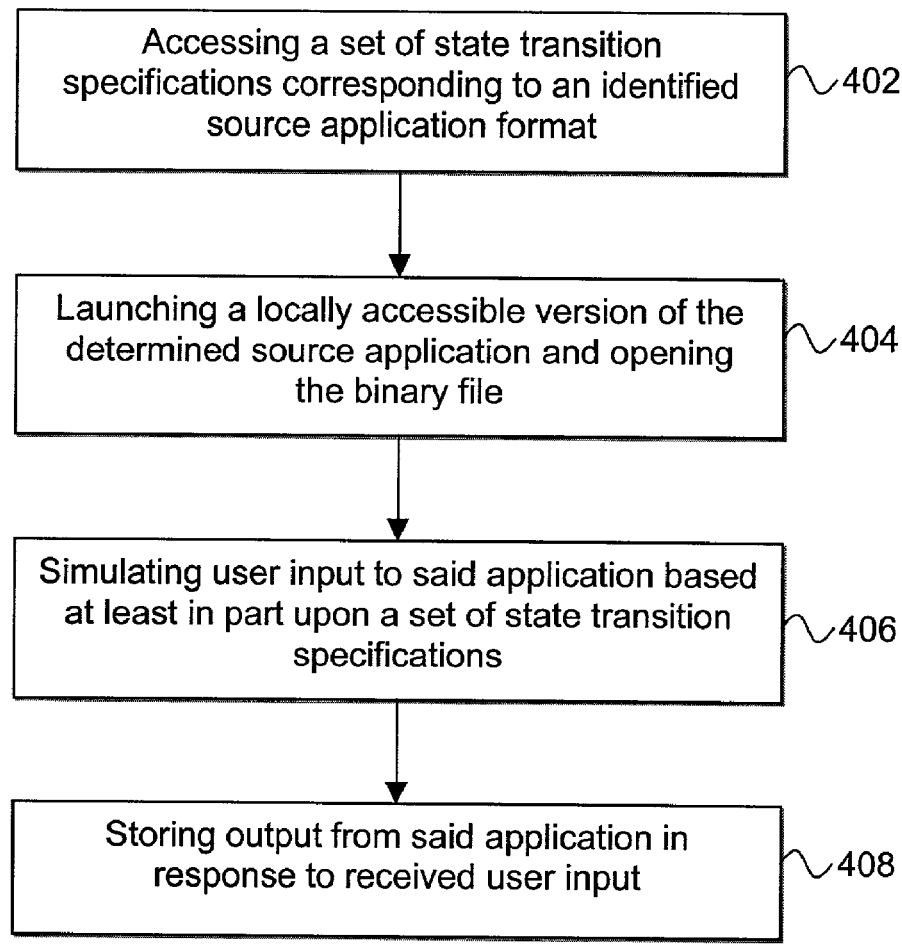
FIG. 4 illustrates an operation flow of the user interface display generation aspect of the enhanced email program, in accordance with one embodiment.

FIG. 4 illustrates an operation flow of the user interface display generation aspect of the enhanced email program, in accordance with one embodiment of the present invention. As described earlier, the enhanced email program of the present invention may execute on the equipment of email sender 102, email server 121, and/or email recipient 112. For the illustrated embodiment, however, it is assumed that enhanced email program 104 is executing on the equipment of email sender 102.

To begin, a set of state transition specifications or "rules" defining instantiations of the end user interface for various display states of enhanced email program 104 are accessed, block 402. In one embodiment, the transition specifications are accessed based upon the determined source application format. In one embodiment, the specifications are advantageously expressed, employing an XML like specification language (as shown in FIG. 10). At block 404, enhanced email program 104 further launches a locally accessible version of the determined source application while concurrently opening the binary file to be attached. In one embodiment, the locally accessible version of the source application is collocated with enhanced email program 104 within a storage medium of the email sender's computing equipment. In other embodiments, the source application may be stored on a file server and executed remotely by the computing equipment hosting enhanced email program 104. The physical location of the locally accessible version of the source application is unimportant so long as the computing equipment hosting the enhanced email program 104 can execute or "launch" the source application corresponding to the attachment type resulting in the binary file being "opened". In one embodiment, enhanced email program 104 utilizes a lookup table or registry to identify accessible source applications that are compatible with the source application originally used to create the attachment.

Once a compatible source application is identified and launched, enhanced email agent 104 simulates user input into the executing source application, block 406. In one embodiment, the user input to be simulated is determined based upon the set of state transition specifications. In response to the simulated user input, enhanced email program 104 intercepts and stores the resulting output generated by the source application, block 408.

Figure 5:
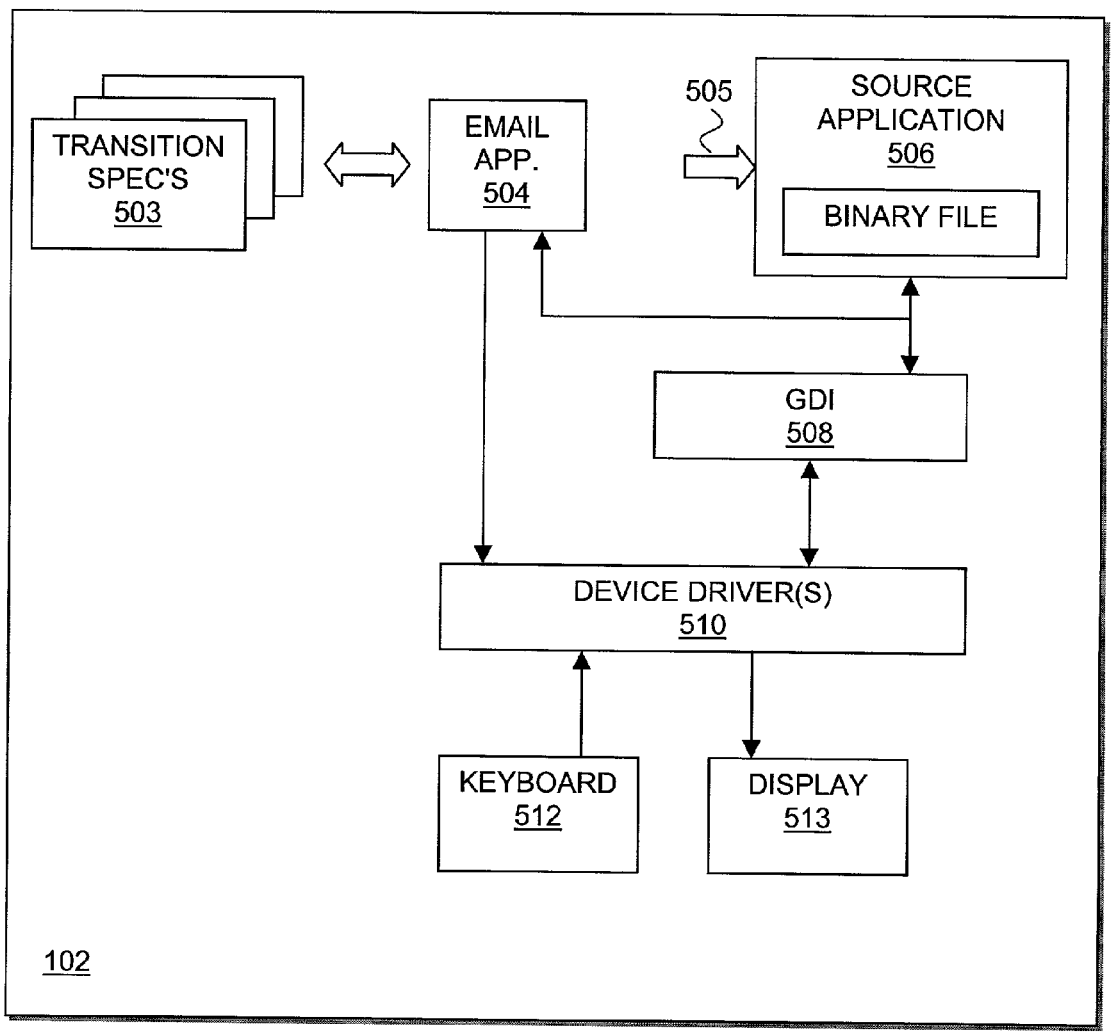
FIG. 5 graphically illustrates the user interface display generation aspect of enhanced email program 104 in accordance with one embodiment as described above with respect to FIG. 4.

FIG. 5 graphically illustrates the user interface display generation aspect of enhanced email program 104 in accordance with one embodiment as described above with respect to FIG. 4. Source application 506 is shown executing within a Microsoft Windows based implementation of mail sender 102 with an opened binary file attachment that is to be converted into a self-contained representation. In accordance with one embodiment of the invention, enhanced email program 504 provides simulated user input to source application 506 via an input port such as port 505, based at least in part upon state transition specifications 503. The state transition specifications 503 specify conditions governing transitions between defined display states (i.e. instantiations of the user interface) as a user interacts with source application 506.

Conventionally, Microsoft Windows-based applications communicate with a graphics device interface (GDI), which in turn, communicates with individual hardware device drivers. The GDI essentially acts as a buffer between the applications and device drivers, which perform hardware-specific functions that generate output for devices such as display device. In such a conventional arrangement, source application 506 would issue commands to GDI 508, which are then mapped by GDI 508 to available objects as determined by the limitations of a given device driver 510. In the present invention, however, the output from source application 506 is additionally intercepted and captured by enhanced email program 504 in the form of a user interface display. Depending upon transition specifications 503, this process of providing simulated user input to source application 506 and capturing the output is iteratively continued until all possible state transitions have been exhausted.

Transition Specifications

Figure 6A:
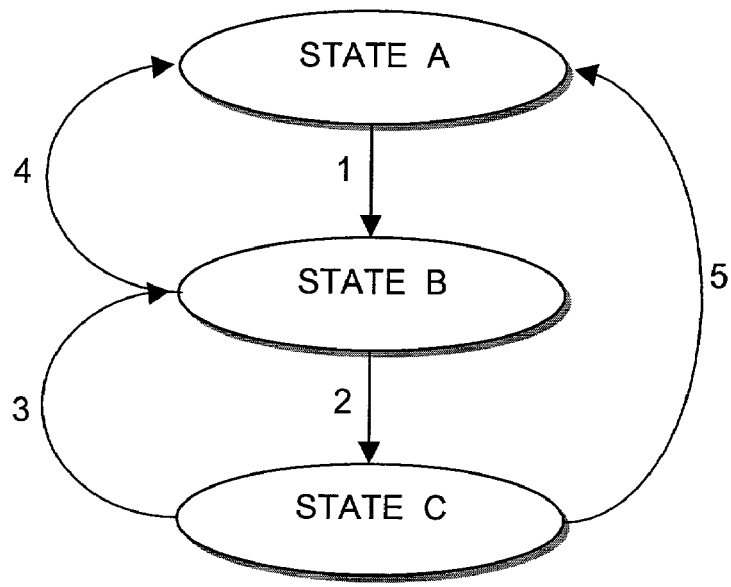
FIGS. 6A and 6B each represent a state diagram illustrating various transition specifications in accordance with one embodiment of the invention.
Figure 6B:
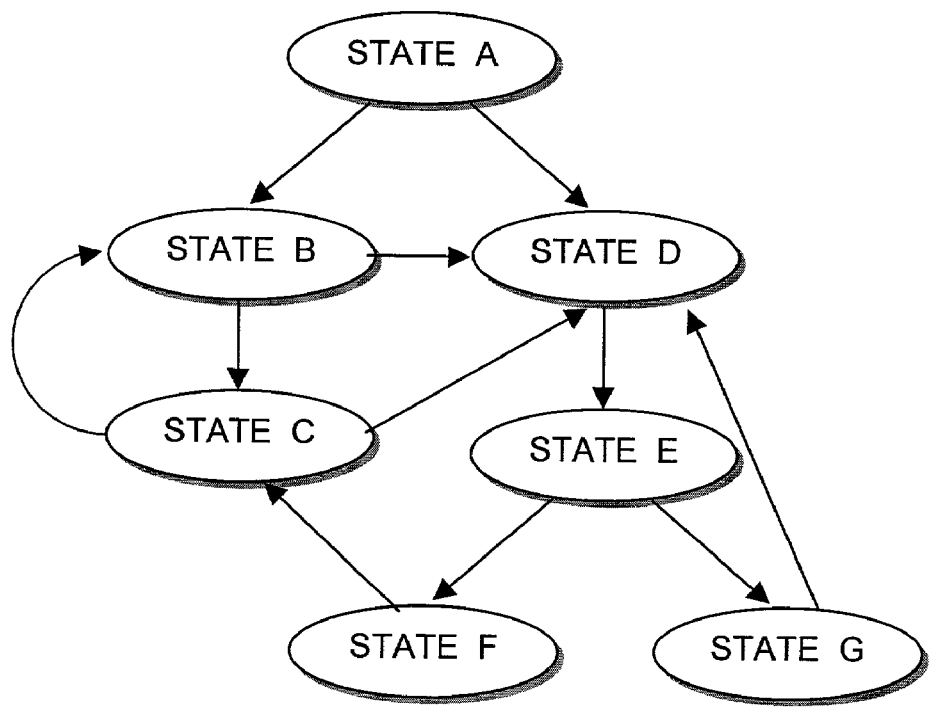

FIGS. 6A and 6B each represent a state diagram illustrating various transition specifications in accordance with one embodiment of the invention. As described earlier, the transition specifications depict legitimate display state transitions that may be performed between captured user interface displays. For example, user interface display "A" may be followed by user interface display "B", which may in turn be followed by user interface display "A" or "C". Whether certain display state transitions are to be considered legitimate or illegitimate is source application dependent.

Example Application

Figure 7A:
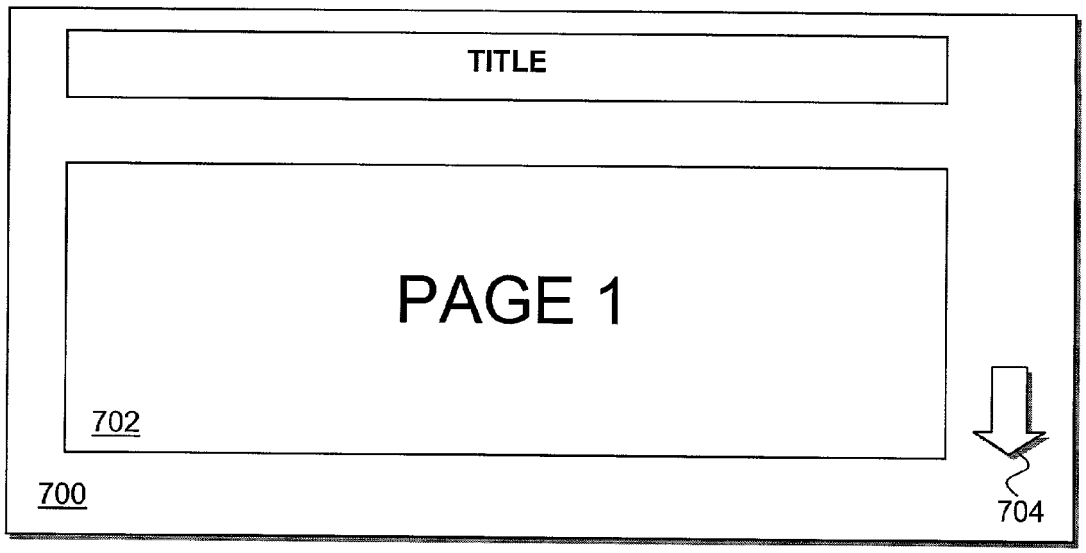
FIGS. 7A and 7B together illustrate an example application of present invention including various user interface displays generated in association with a word processing source application, in accordance with one embodiment of the present invention.
Figure 7B:
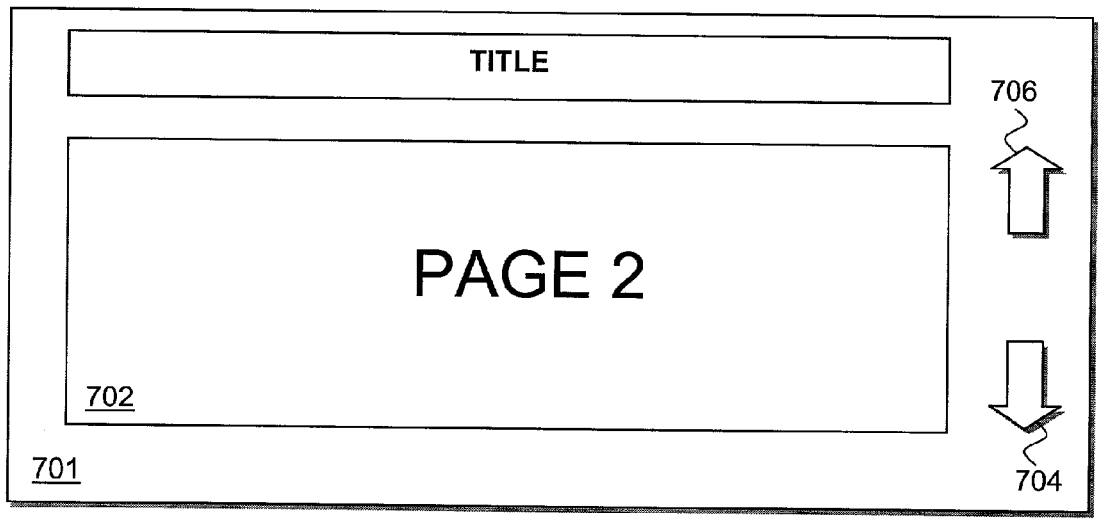

FIGS. 7A and 7B together illustrate an example application of present invention including various user interface displays generated in association with a word processing source application, in accordance with one embodiment of the present invention. Under the current example, user interface displays 700 and 701 would be transmitted in association with an email message to a designated recipient in the form of the self-contained representation as described above. Once a recipient receives the email message the representation is detached, and if the representation was encoded prior to transmission, the representation is then decoded using the appropriate encode/decode protocol such as MIME, Uuencode, BinHex, and so forth. In one embodiment, the self-contained representation is implemented using an XML like specification language such as that shown in FIG. 10. Accordingly, the recipient need only be equipped with a generic web browser in order to view the representation.

User interface display 700 illustrates a first user interface instantiation that may be rendered on the recipient's client computer so as to enable the recipient to view the contents of the original (source) binary file in a self-contained manner. User interface display 700 includes display pane 702 as well as scroll arrow 704. In accordance with the teachings of the present invention, if the recipient selects (e.g. via a mouse or pointing device) scroll arrow 704, the content displayed within display pane 702 transitions to a state corresponding to a user interface instantiation that includes the second page of content as shown in FIG. 7B. Along with the content of display pane 702 transitioning, arrow 706 is further rendered indicating that the top of the associated document is no longer being displayed. The recipient is now provided with the opportunity to select scroll arrow 704, which would cause a third page of content to be displayed in display pane 702, or to select scroll arrow 706, which would cause the first page of content to again be displayed. Depending upon the level of sophistication desired, the transition specifications of the present invention may number from few to many, with the increasing number of specifications providing an increasingly rich user experience.

Example End User Interface Implementation

Figure 8:
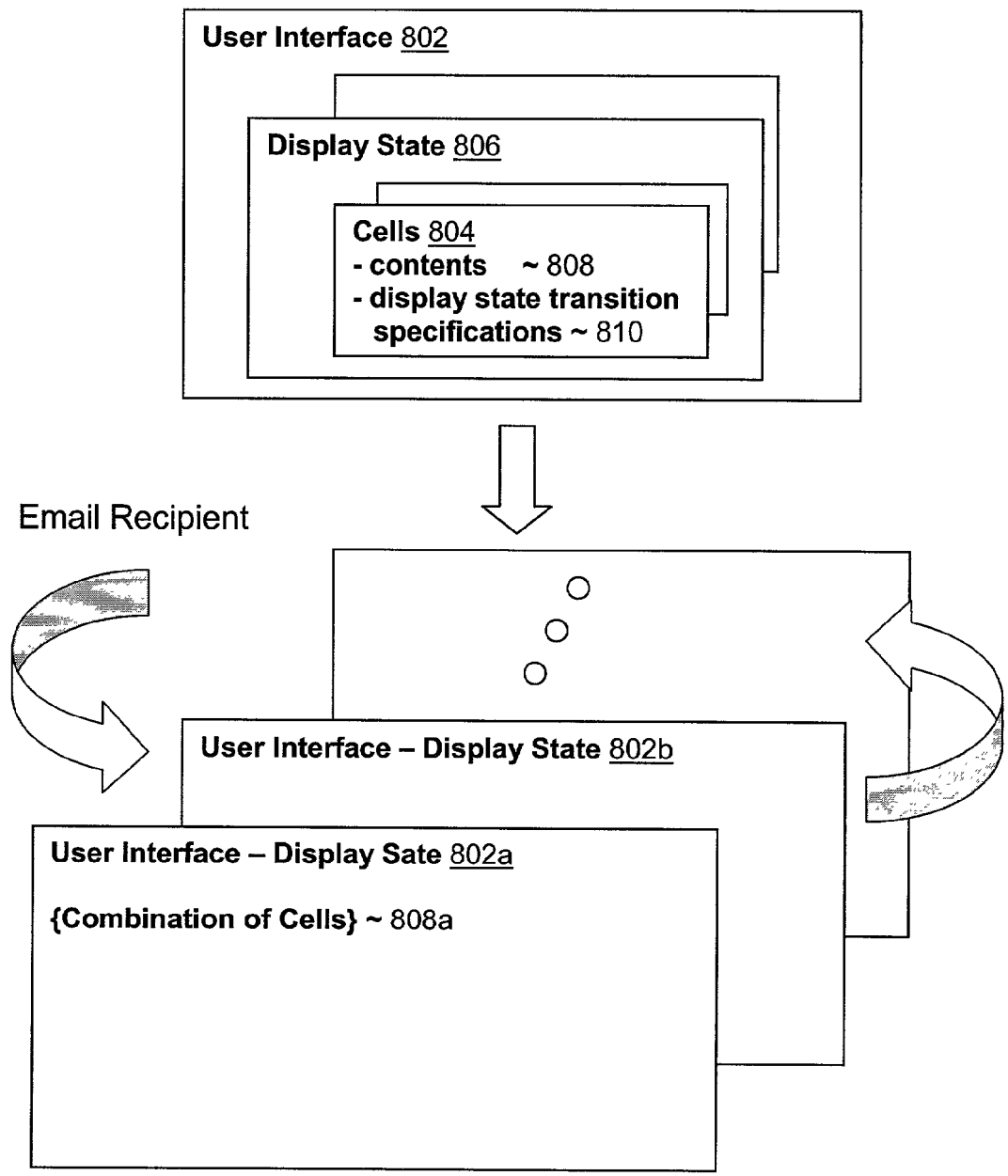
FIG. 8 illustrates an end user interface implementation technique suitable for use to practice the present invention, in accordance with one embodiment.

FIG. 8 illustrates an end user interface implementation technique suitable for use to practice the present invention, in accordance with one embodiment. As illustrated, a user interface 802 is provisioned through the employment of display states defined by display state definitions 806. Each display state definition 806 includes specifications 808 for the constituting contents (not shown) for an instantiation (or portion thereof) of user interface 802, e.g. 802*a*, 802*b*, and so forth, and display state transition rules 810 specifying the next display state (or instantiation) of user interface 802 in the event of user interactions with the displayed content.

In accordance with another embodiment, a user interface 802 is provisioned through the employment of display cells correspondingly defined by display cell definitions 804. Each display cell definition 804 includes specification 808 for the constituting contents (not shown) of the display cell. The display cell may be displayed in different instantiations (or display states) of the user interface. That is, a display cell definition may specify a display cell for one or more display states.

In the illustrated embodiment, each display state definition 808 includes applicable ones of the display cell definitions 804, and each display cell definition 804 includes specification 810 for a display state transition rule, specifying the next display state (or instantiation) of user interface 802 in the event a user interacts with the rendered display cell 804 being defined. Provision of a locally controlled end user interface having display states, display cells and display state transition rules is the subject matter of co-pending U.S. Patent Application, entitled "Display State and/or Cell Based User Interface Provision Method and Apparatus", file Sep. 14, 2000, having common inventorship with the present invention. The specification of which is hereby incorporated by reference.

Example Computer System

Figure 9:
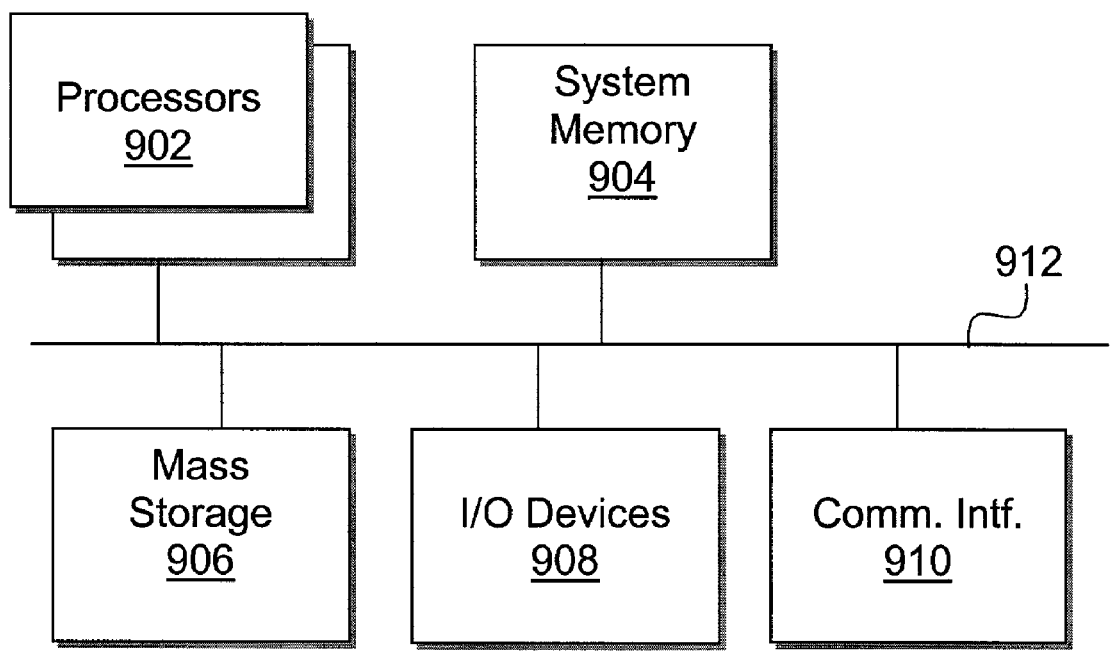
FIG. 9 illustrates an internal component view of an email sender device, in accordance with one embodiment.

FIG. 9 illustrates an example computer system suitable for use as either a sender/recipient computer 102/112 of FIG. 1, in accordance with one embodiment. As shown, computer system 900 includes one or more processors 902 and system memory 904. Additionally, computer system 900 includes mass storage devices 906 (such as diskette, hard drive, CDROM and so forth), input/output devices 908 (such as keyboard, cursor control and so forth) and communication interfaces 910 (such as network interface cards, modems and so forth). The elements are coupled to each other via system bus 912, which represents one or more buses. In the case of multiple buses, they are bridged by one or more bus bridges (not shown). Each of these elements performs its conventional functions known in the art. In particular, system memory 904 and mass storage 906 are employed to store a working copy and a permanent copy of the programming instructions implementing the teachings of the present invention. The permanent copy of the programming instructions may be loaded into mass storage 906 in the factory, or in the field, as described earlier, through a distribution medium (not shown) or through communication interface 910 (from a distribution server (not shown). The constitution of these elements 902-912 are known, and accordingly will not be further described.

CONCLUSION AND EPILOGUE

Thus, it can be seen from the above descriptions, a novel method and apparatus for generating autonomous email attachments has been described. While the present invention has been described in terms of the above-illustrated embodiments, those skilled in the art will recognize that the invention is not limited to the embodiments described. The present invention can be practiced with modification and alteration within the spirit and scope of the appended claims. The description is thus to be regarded as illustrative instead of restrictive on the present invention.

What is claimed is:

1. A method comprising:
    identifying, by a computing device, a format of a binary file generated by a source application;
    selecting, by the computing device, a set of user interface display specifications from a plurality of sets of user interface display specifications, based at least in part on the identified format of the binary file; and
    processing, by the computing device, the binary file to generate a self-contained representation of user interface displays of said binary file rendered when contents of the binary file are viewed using the source application, by associating results of said processing of the binary file with the selected set of user interface display specifications, to enable viewing of the user interface displays independently of the source application;
    wherein each user interface display specification includes one or more transition rules specifying one or more transitions to one or more other user interface displays specified by one or more other user interface display specifications;
    wherein said processing further including launching by the computing device a locally accessible version of the application stored in the computing device; simulating by the computing device user input(s) to said application based at least in part upon said selected set of user interface display specifications; and storing by the computing device output(s) from said application in response to said user input(s),
    attaching by the computing device said self-contained representation with an electronic message;
    transmitting by the computing device said electronic message and said attached self-contained representation to one or more recipients for viewing, where the viewing includes rendering said user interface displays in accordance with said user interface display specifications and user input(s).

2. The method of claim 1, wherein said binary file is either a word processing document or a spreadsheet document.

3. The method of claim 1, wherein said identifying is based upon a filename extension associated with said binary file.

4. The method of claim 1, wherein each specification includes one or more transition rules specifying one or more transitions to one or more other user interface displays specified by one or more other specifications.

5. The method of claim 1, wherein each of said user interface displays comprises one or more display cells, and each of said specification comprises one or more display cell specifications correspondingly specifying the one or more display cells.

6. A computer implemented method comprising:
receiving, by a computing device, an email message including an associated first attachment of a first attachment type; determining, by the computing device, whether said first attachment type is associated with a member of a group of one or more supported source applications;
selecting, by the computing device, a set of one or more user interface display specifications from a plurality of sets of one or more user interface display specifications, based upon said first attachment type if it is determined said first attachment type is associated with a member of said group of one or more supported source applications;
launching, by the computing device, a locally accessible version of the associated source application stored on the computing;
simulating, by the computing device, one or more user input signals based upon said selected set of one or more user interface display specifications; and
capturing, by the computing device, output responses of the associated source application to said one or more user input signals, and associating the captured output responses with the selected set of user interface display specifications to generate a self-contained representation of said first attachment to allow subsequent viewing of the attachment independently of the associated source application;
associating by the computing device said representation with said email message in the form a second attachment, replacing said first attachment;
encoding by the computing device said email message and said second attachment; and
transmitting said encoded email message and second attachment to a designated recipient.

7. The method of claim 6, wherein said encoding comprises encoding the representation in accordance with the MIME protocol.

8. The method of claim 6, wherein said first attachment type comprises a proprietary format.

9. The method of claim 6, wherein each of said plurality of user interface displays comprises one or more display cells, and each of said user interface display specifications comprises one or more display cell specifications.

10. The method of claim 9, wherein each of said specifications further comprises one or more transition rules, each transition rule specifying a transition to a user interface display when the user interface displays enter a particular display state.

11. An article of manufacture comprising:
a storage medium having stored therein a plurality of programming instructions when executed render a computing device to perform:
identifying a format of a binary file generated by a source application;
selecting a set of user interface display specifications from a plurality of sets of user interface display specifications, based at least in part on the identified format of the binary file;
processing the binary file to generate a self-contained representation of user interface displays of said binary file rendered when contents of the binary file are viewed using the source application, by associating results of said processing of the binary file with the selected set of user interface display specifications to enable viewing of the user interface displays independent of the source application;
wherein each user interface display specification includes one or more transition rules specifying one or more transitions to one or more other user interface displays specified by one or more other user interface display specifications, and
at least one processor coupled to the storage medium to execute the programming instructions;
wherein said processing further including launching by the computing device a locally accessible version of the application stored in the computing device; simulating by the computing device user input(s) to said application based at least in part upon said selected set of user interface display specifications;
storing by the computing device output(s) from said application in response to said user input(s);
attaching by the computing device said self-contained representation with an electronic message;
transmitting by the computing device said electronic message and said attached self-contained representation to one or more recipients for viewing, where the viewing includes rendering said user interface displays in accordance with said user interface display specifications and user input(s).

12. The article of manufacture of claim 11, wherein said binary file is either a word processing document or a spreadsheet document.

13. The article of manufacture of claim 11, wherein said identifying is performed based upon a filename extension associated with said binary file.

14. The article of manufacture of claim 11, wherein each transition rule specifies transition to another user interface display specified by another specification when the user interface displays enter a particular user interface display states.

15. The article of manufacture of claim 11, wherein each of said user interface displays comprises one or more display cells, and each of said specification comprises one or more display cell specifications correspondingly specifying the one or more display cells.

16. An article of manufacture comprising:
a storage medium having stored therein a plurality of programming instructions when executed render a computing device to
receive an email message including an associated first attachment of a first attachment type,
determine whether said first attachment type is a member of a group of one or more supported source applications,
selecting a set of one or more specifications from a plurality of sets of one or more user interface display specifications, based upon said first attachment type if it is determined said first attachment type is associated with a member of said group of one or more supported source applications,
launch a locally accessible version of the associated source application stored on the computing device,
simulate one or more user input signals based upon said selected set of one or more user interface display specifications, and
capture output responses of the associated source application to said one or more user input signals, and associate the captured output responses with the selected set of user interface display specifications to generate a self-contained representation of said first attachment to allow subsequent viewing of the attachment independently of the associated source application;

associate said representation with said email message in the form a second attachment replacing said first attachment;

encode said email message and said second attachment; and transmit said email message and said second attachment to a designated recipient; and at least one processor coupled to the storage medium to execute the programming instructions.

17. The method of claim 16, wherein said encoding comprises encoding the representation in accordance with the MIME protocol.

18. The article of manufacture of claim 16, wherein said first attachment type comprises a proprietary format.

19. The article of manufacture of claim 16, wherein each of said plurality of user interface displays further comprises one or more display cells, and each of said user interface display specifications comprises one or more display cell specifications.

20. The article of manufacture of claim 19, wherein each of said specifications further comprises one or more transition rules, each transition rule specifying a transition to a user interface display when the user interface displays enter a particular display state.

* * * * *

UNITED STATES PATENT AND TRADEMARK OFFICE
CERTIFICATE OF CORRECTION

PATENT NO. : 7,599,992 B2
APPLICATION NO. : 10/082601
DATED : October 6, 2009
INVENTOR(S) : Satoshi Nakajima It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1174 days.

Signed and Sealed this

Twenty-eighth Day of September, 2010

David J. Kappos
*Director of the United States Patent and Trademark Office*